United States Patent
Bahramian

(10) Patent No.: US 7,234,856 B2
(45) Date of Patent: Jun. 26, 2007

(54) ELECTRICAL CONNECTOR, LED ASSEMBLY, AND METHOD OF ASSEMBLY THEREFOR

(76) Inventor: Bahram Bahramian, 202 Halpine Walk Ct., Rockville, MD (US) 20851

( * ) Notice: Subject to any disclaimer, the term of this patent is extended or adjusted under 35 U.S.C. 154(b) by 209 days.

(21) Appl. No.: 10/724,181

(22) Filed: Dec. 1, 2003

(65) Prior Publication Data

US 2005/0030763 A1 Feb. 10, 2005

Related U.S. Application Data

(63) Continuation of application No. 10/633,548, filed on Aug. 5, 2003, now Pat. No. 7,048,398.

(51) Int. Cl.
*F21V 33/00* (2006.01)

(52) U.S. Cl. ............ 362/652; 362/659; 439/405; 439/426

(58) Field of Classification Search .......... 362/558, 362/219, 221, 226, 249, 407, 457, 652, 659, 362/657; 439/396, 405, 426, 387–441
See application file for complete search history.

(56) References Cited

U.S. PATENT DOCUMENTS

| | | | |
|---|---|---|---|
| 2,800,635 A * | 7/1957 | Christenbery | 439/419 |
| 4,648,690 A | 3/1987 | Ohe | |
| 4,794,492 A | 12/1988 | Vinther | |
| 4,855,882 A * | 8/1989 | Boss | 362/238 |
| 5,036,248 A | 7/1991 | McEwan et al. | |
| 5,138,782 A | 8/1992 | Mizobe | |
| 5,143,285 A | 9/1992 | Wise | |
| 5,408,773 A | 4/1995 | Hwang | |
| 5,668,907 A | 9/1997 | Veligdan | |
| 5,832,642 A | 11/1998 | Dalton | |
| 5,997,338 A * | 12/1999 | Pohjola | 439/425 |
| 6,017,241 A * | 1/2000 | Komai | 439/419 |
| 6,023,869 A | 2/2000 | Durbin | |
| 6,026,602 A | 2/2000 | Grondal et al. | |
| 6,027,235 A | 2/2000 | Chen | |
| 6,092,318 A | 7/2000 | Arie et al. | |
| 6,106,127 A | 8/2000 | Fuwausa | |
| 6,232,592 B1 | 5/2001 | Sugiyama | |
| 6,270,236 B1 | 8/2001 | Brussog | |
| 6,341,440 B1 | 1/2002 | Lee | |
| 6,367,180 B2 | 4/2002 | Weiss et al. | |
| 6,443,585 B1 | 9/2002 | Saccomanno | |
| 6,454,424 B1 | 9/2002 | Tobin et al. | |
| 6,471,379 B2 | 10/2002 | Bucher et al. | |
| 6,530,164 B2 | 3/2003 | Gai | |
| 6,539,656 B2 | 4/2003 | Maas et al. | |

(Continued)

*Primary Examiner*—Laura Tso

(57) ABSTRACT

An electrical connector for connecting multiple light emitting diodes (LEDs) in parallel to a two-wire electrical supply bus, made up of upper and lower halves that snap together and contact pins that pass through holes in the upper half to make insulation displacement connections with the conductors of the supply bus. Assemblies including large numbers of LEDs are made by snapping connectors onto the bus, inserting contacts into the connectors, and connecting LEDs to the contact pins, although not necessarily in that order. The contact pins may be hollow to receive the LED leads. Also, the positions of the holes in the upper halves of the connectors, and therefore of the contact pins, may be staggered, so that the spacing between the contacts can be made equal to the pitch between the leads of the LEDs without spacing the conductors of the supply bus further apart.

11 Claims, 8 Drawing Sheets

U.S. PATENT DOCUMENTS

2002/0114166 A1  8/2002  Muller et al.
2002/0136023 A1  9/2002  Oneil

2003/0031032 A1  2/2003  Wu et al.

* cited by examiner

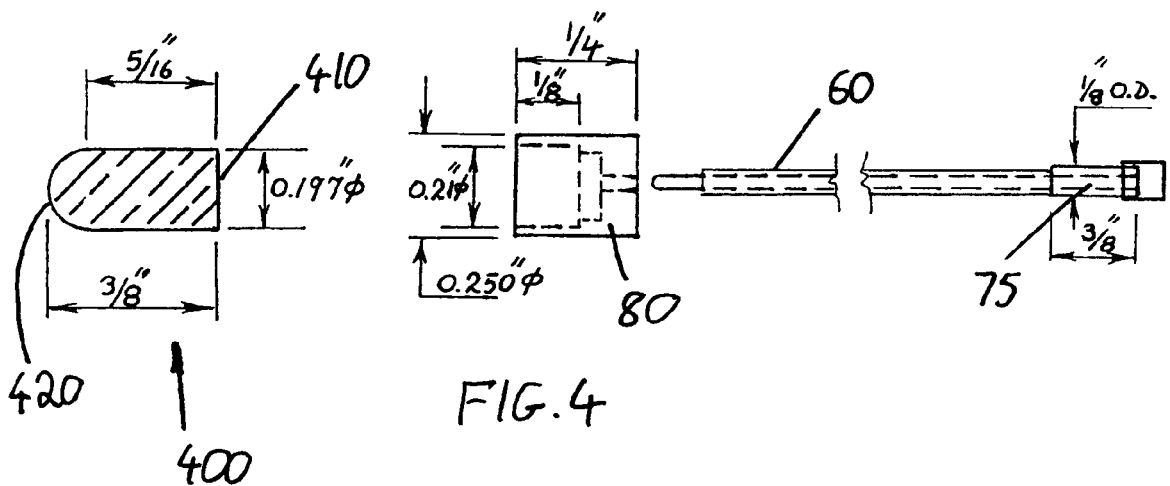
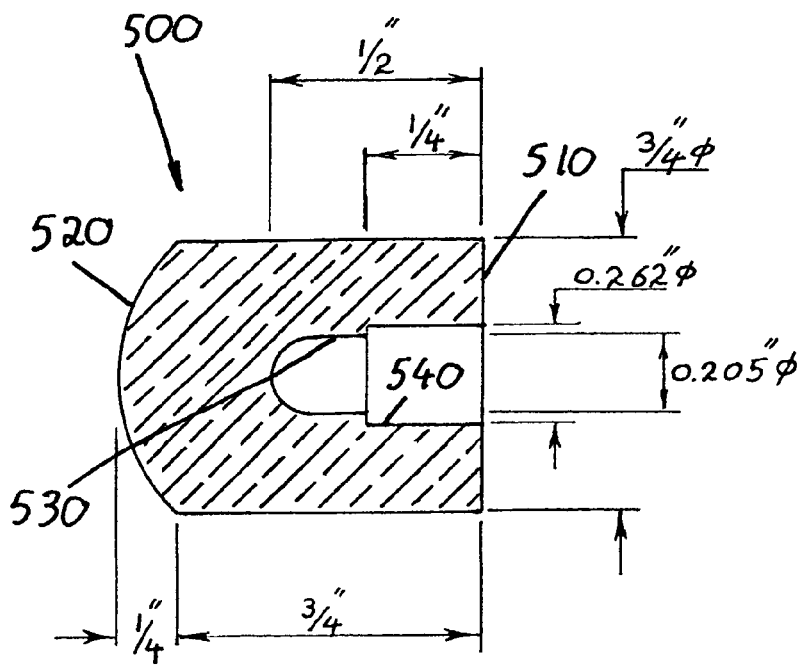

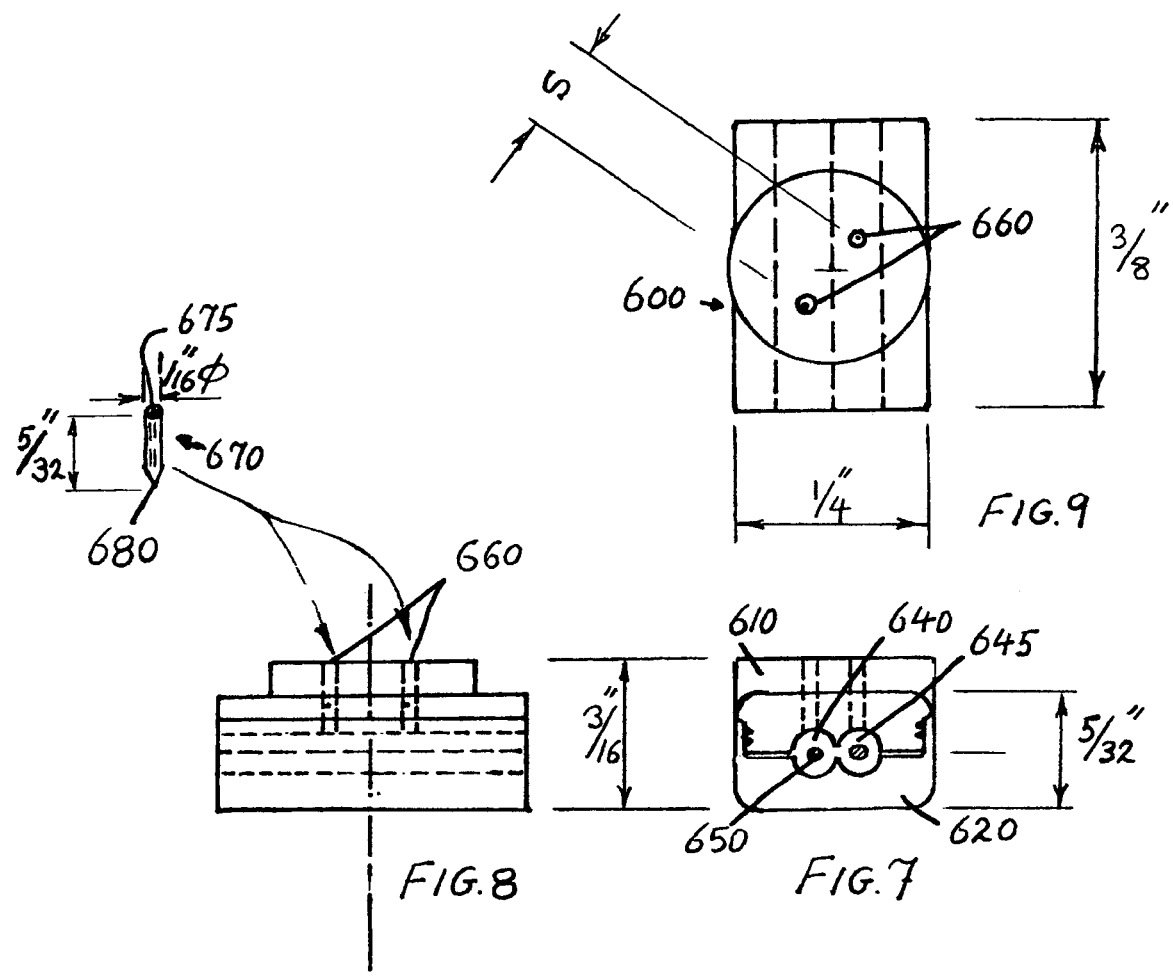
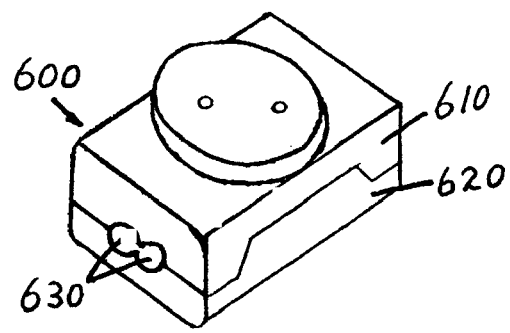

"XI-XI"

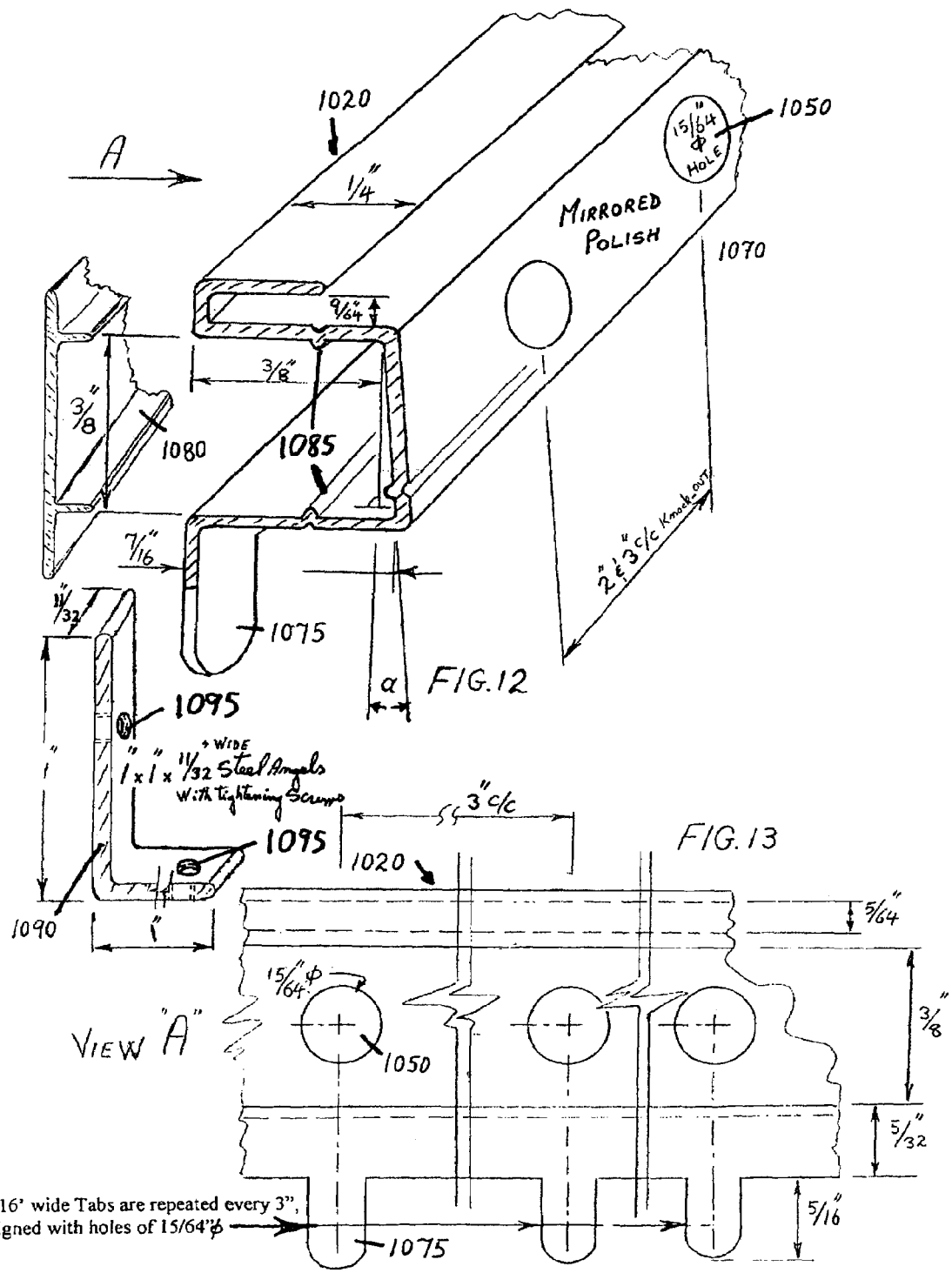

US 7,234,856 B2

ELECTRICAL CONNECTOR, LED ASSEMBLY, AND METHOD OF ASSEMBLY THEREFOR

BACKGROUND OF THE INVENTION

1. Field of the Invention

The present invention relates to a system for lighting. More particularly: the invention relates to a system alternately employing light emitting diodes (LEDs) or a light source guided through optical fibers.

2. Discussion of the Background

Signs and pictures can benefit from being illuminated, either for aesthetic reasons, or for visibility. In particular, outdoor signs may need to be illuminated to be read after darkness. Almost everyone has had the experience of trying to locate a residential address after dark with only the benefit of car headlights. Illuminated signs for displaying house numbers are widely known, but have not found widespread popularity. Known signs of this type tend to be heavy, bulky and consume excessive electrical power. The householder must normally either arrange for the sign to be wired into the house electrical supply or be prepared to frequently replace batteries or bulbs. Some form of light-sensitive switching may need to be incorporated to reduce power consumption, thereby adding complexity and bulk. In addition, it is undesirable to have external electrical wiring, which is exposed to the vagaries of the weather. There is a need for house number signs that inherently consume less power, as well as for signs that can be illuminated without having electrical wiring outside the house.

The above and other disadvantages of the background art are overcome by the teachings of the present invention, as will be discussed below.

SUMMARY OF THE INVENTION

The present invention provides for a system of object lighting that may optionally employ either multiple Light Emitting Diodes (LEDs) connected to an electrical bus via Insulation Displacement Connectors (IDC), or alternatively a central light source with light beams distributed through optical fibers via a splitter to a number of lenses providing point light sources equivalent to the LEDs.

Various lighting configurations may be achieved by the system of the invention. These include signs and pictures illuminated by point light sources arranged around a periphery thereof and configured to be reflected via a rear mirrored surface. This arrangement is particularly well adapted to illuminate house numbers, but may be used to illuminate any sign or picture.

In another aspect of the invention, a lens system is provided for point light sources, so that either LEDs or optical fiber light sources can provide the same illumination pattern. A small lens is configured to fit on the end of each optical fiber and provide the same outer curvature as a standard LED, and a larger lens is configured to fit either a standard LED or the small lens internally. In this manner, similar beams of light are produced regardless of whether LEDs or optical fibers are employed, and therefore optical fibers may be substituted for LEDs or vicea versa without affecting the way the light is distributed.

In a further aspect of the invention, electrical connectors are provided to connect a plurality of LEDs to an electrical bus by displacement of the insulation. This enables a relatively large number of LEDs to be connected onto an electrical wiring harness or power supply bus with a minimum amount of wiring and a minimum number of assembly operations.

BRIEF DESCRIPTION OF THE DRAWINGS

The invention will now be further described with reference to the drawings, in which like numerals designate like elements, and in which any dimensions given are by way of example.

FIG. 4 is a sectional side view of a small lens according to a preferred embodiment of the invention.

FIG. 5 is a sectional side view of a large lens according to a preferred embodiment of the invention.

FIG. 6 is an isometric view of an electrical connector according to a preferred embodiment of the invention.

FIG. 7 is an end view of an electrical connector according to a preferred embodiment of the invention.

FIG. 8 is a side view of an electrical connector according to a preferred embodiment of the invention.

FIG. 9 is a plan view of an electrical connector according to a preferred embodiment of the invention.

FIG. 12 is an exploded isometric view in greater detail of a light panel edging strip according to the invention.

FIG. 13 is a side view of the light panel edging strip of FIG. 12.

DETAILED DESCRIPTION OF THE DRAWINGS

Figure 10:
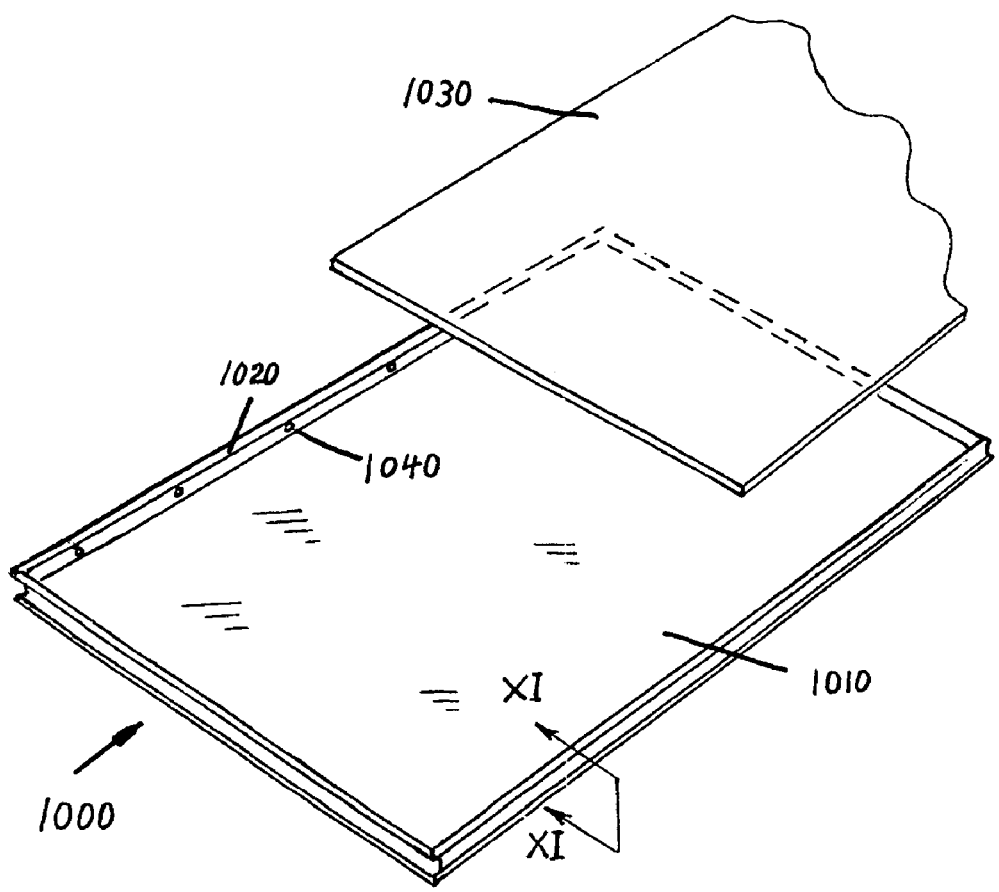
FIG. 10 is a pictorial view of a light panel according to the invention, showing a diffuser sheet removed.
Figure 11:
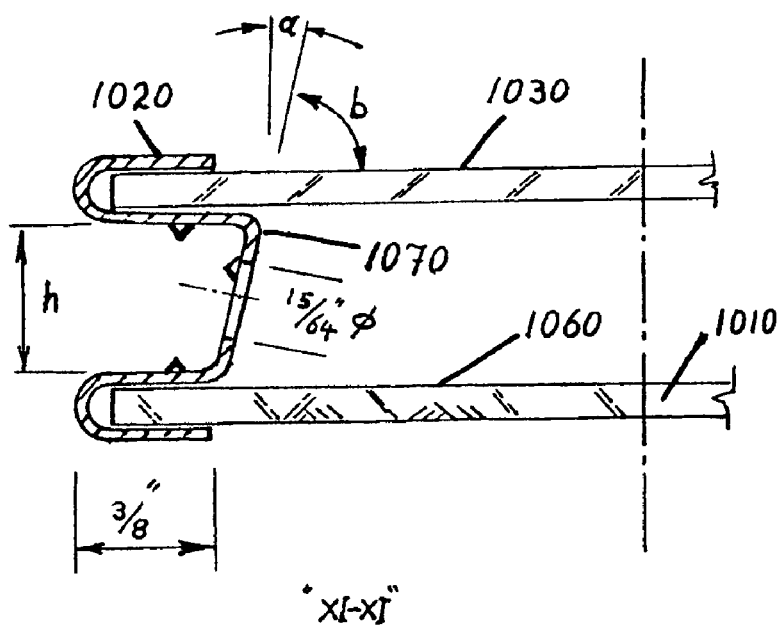
FIG. 11 is a sectional view through section XI—XI of FIG. 10.

A light panel 1000 according to a preferred embodiment of the invention is shown in FIG. 10. Light panel 1000 includes a mirrored back sheet 1010, an edging strip 1020, a frontal diffuser sheet 1030 and a plurality of point light sources 1040. The diffuser sheet 1030 is shown removed from the light panel 1000 in this view for clarity. FIG. 11 shows the light panel 1000 fully assembled, but without point light sources 1040, when viewed on section XI—XI of FIG. 10. Both the diffuser sheet 1030 and the mirrored back sheet 1010 may be made from acrylic, or from any other suitable material. Point light sources 1040 are inserted in apertures 1050 in edging strip 1020. Edging strip 1020 is preferably made of rust proof steel with a Chrome plated or otherwise mirrored inner surface 1070, but may be made from other suitable materials without departing from the scope of the invention.

The edging strip 1020 is arranged to overlap the diffuser sheet 1030 and the backing sheet 1010 by a distance 'd', which in a non-limiting example may be 0.375 inches, and an inner surface 1070 of edging strip 1020 is angled downwards by an angle 'a'. Angle 'a' is preferably in the range 10–15°, preferably substantially 12°, i.e. angle 'b' would be substantially 78°, such that light from point light sources 1040 is reflected from mirrored surface 1060 of back sheet 1010 towards diffuser sheet 1030. As the point light sources 1040 are arranged to emit light normal to the inner surface 1070, the angle of incidence of the light with respect to the mirrored surface 1060 of the backing sheet 1010 is also equal to the angle 'a'. The diffuser sheet 1030 may be covered by a further sheet acting as a mask (not shown), which does not permit the passage of light except through selective openings, such as cut out numerals and/or letters, for example to display a house number or other message. In an alternative embodiment, the light panel may be used as a picture frame and the mask may be the mat used in framing the picture. This results in an appealing backlighting effect.

Angle 'a' may, of course, be varied outside of the range from 10–15° without departing from the scope of the invention. Inner surface 1070 of edging strip 1020 is also preferably mirrored to maximize internal reflection of the light. This arrangement allows height 'h' in a non-limiting example to be as low as 0.675 inches, which is significantly less than the thickness of light panels known in the background art. Point light sources 1040 may be interchangeably provided either by LEDs or by lenses connected by optical fibers to central light source 10.

FIG. 12 shows edging strip 1020 in greater detail, in an exploded view together with cap 1080 and mounting bracket 1090, and FIG. 13 shows a side view of edging strip 1020. Tabs 1075 are provided on the same centers as holes 1050, preferably at a spacing of 1 inch, although the spacing may be varied without departing from the scope of the invention. Brackets 1090 are provided with holes 1095 for receiving tightening screws (not shown) and are used to retain edging strip 1020 at the corners of light panel 1000. When the corners of light panel 1000 are assembled, brackets 1090 are placed such that screwing the tightening screws into holes 1095 will push brackets 1090 against the inside of ridges 1085 in edging strip 1020. Brackets 1090 may be made of steel or any other suitable material. Tabs 1075 may be folded to secure backing sheet 1010 when the light panel 1000 is assembled. Cap 1080 may be made of any suitable plastic or other material, and serves both to finish the appearance of lighting panel 1000 and to cover the wiring or optical fibers leading to point light sources 1040.

In a first embodiment, LEDs may be used for each point light source. Power for the LEDs may be derived from the mains wiring, or from rechargeable batteries connected to a solar cell, or from any other suitable source. Conventionally, this has involved soldering two wires to each LED, which has necessitated a large number of separate soldering operations to assemble a lighting system employing multiple LEDs.

In a preferred embodiment, the present invention overcomes this problem by using low-profile connector 600, as shown in FIGS. 6, 7, 8 and 9. Connector 600 includes an upper part 610 and a lower part 620, which may be molded from a non-conductive thermoplastic such as ABS, or otherwise formed from any suitable material. When upper and lower parts 610 and 620 are assembled together, as shown in the drawings, two cylindrical recesses 630 are formed, through which a wiring harness having two insulated wires 640 may be passed, each including an insulation layer 645 surrounding an inner conductor 650. The inner conductors 650 may be, for example 24 AWG. Upper and lower parts 610 and 620 may, for example, be snapped together by using a simple hand tool (not shown).

Two holes 660 are provided in upper part 610 of connector 600, into which pins 670 are inserted. Holes 660 are placed in a staggered relationship relative to wires 640, so that the spacing 's' is equal to the spacing between the leads of the LED, for example 0.1 inches. A single pin 670 is shown removed from hole 660 in FIG. 8, and is hollow, with a central aperture 675 extending from an upper end, and a point 680 at a lower end thereof. The central aperture 675 is sized to receive a lead of an LED as a push fit, and the pins are configured to be a push fit into holes 660. Pins 670 may be made of brass or any other suitable material. The leads of an LED (not shown) are inserted into central apertures 675 in pins 670, which are then inserted through holes 660 in upper part 610 of connector 600, and the points 680 of pins 670 penetrate the outer insulation layers 645 of wires 640, to make contact with the inner conductors 650 thereof. In one example, the overall size of the connector 600 is 0.25 inches wide and 0.1875 inches high.

Large lens 500 shown in FIG. 5 has a planar rear surface 510 and a convex front surface 520. Front surface 520 has substantially the same curvature as inside surface 530, which is configured to mate with front surface 420 of small lens 400. Surfaces 520 and 530 are highly polished. Inner cylindrical surface 540 of large lens 500 is configured to have a particular diameter so that both the optical fibers and the ferrule of a standard LED are a push fit. Thus, either a small lens 400 (see FIG. 4) or a standard LED may be interchangeably push fit into large lens 500, and in both cases the focal point of the large lens 500 substantially coincides with the focal point of the light source.

Figure 14:
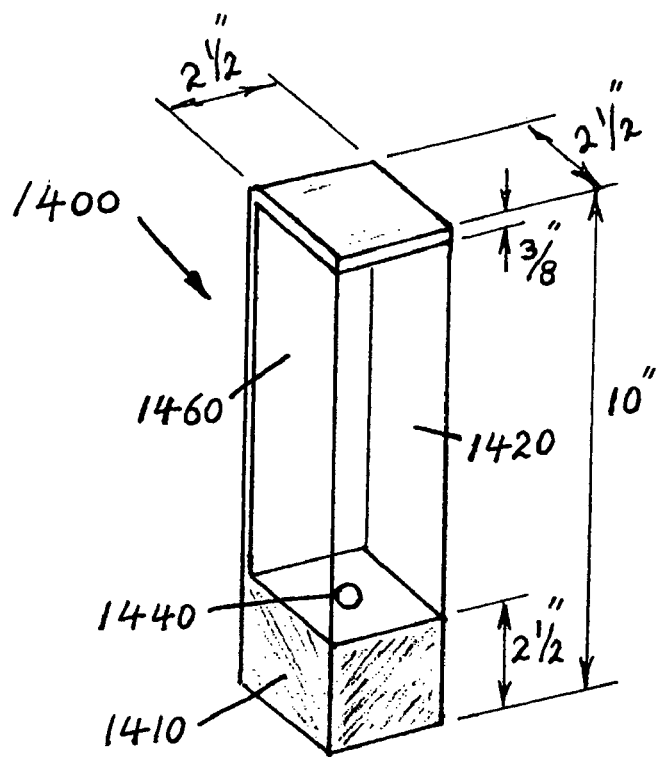
FIG. 14 is an isometric view of a light box according to a further embodiment of the invention
Figure 15:
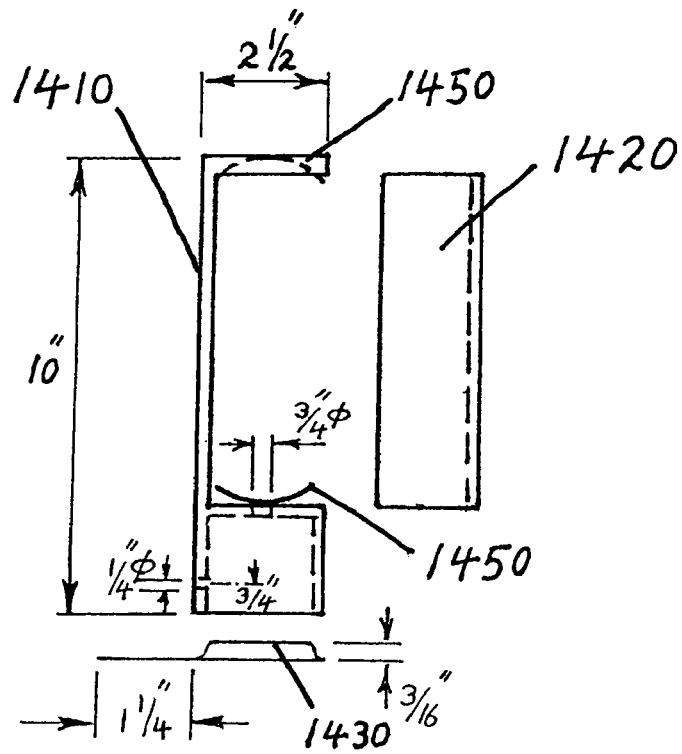
FIG. 15 is an exploded side view of the light box of FIG. 14.

FIGS. 14 and 15 show a light box 1400 according to an embodiment of the invention. Light box 1400 includes a holder 1410, a clear cover 1420, an end cap 1430, a light source 1440 and top and bottom reflective dishes 1450. Holder 1410 is preferably made from black brushed Aluminum, but may be made of any other suitable material, and has a reflective back-plate 1460. Top and bottom reflective dishes 1450 may, for example, be made of a suitable plastic with a reflective metal coating. The clear cover 1420 may be made of plexiglass or the like, and the end cap may be an Aluminum stamping, although other materials may be used. Each light source 1440 may include a large lens 500 inside which is inserted either an LED or a small lens 400 connected via optical fibers to a central light source 10. Multiple light boxes 1400 may, for example, be used for outdoor landscape lighting, or for indoor decorative lighting. These may be connected as shown in FIG. 16.

Figure 16:
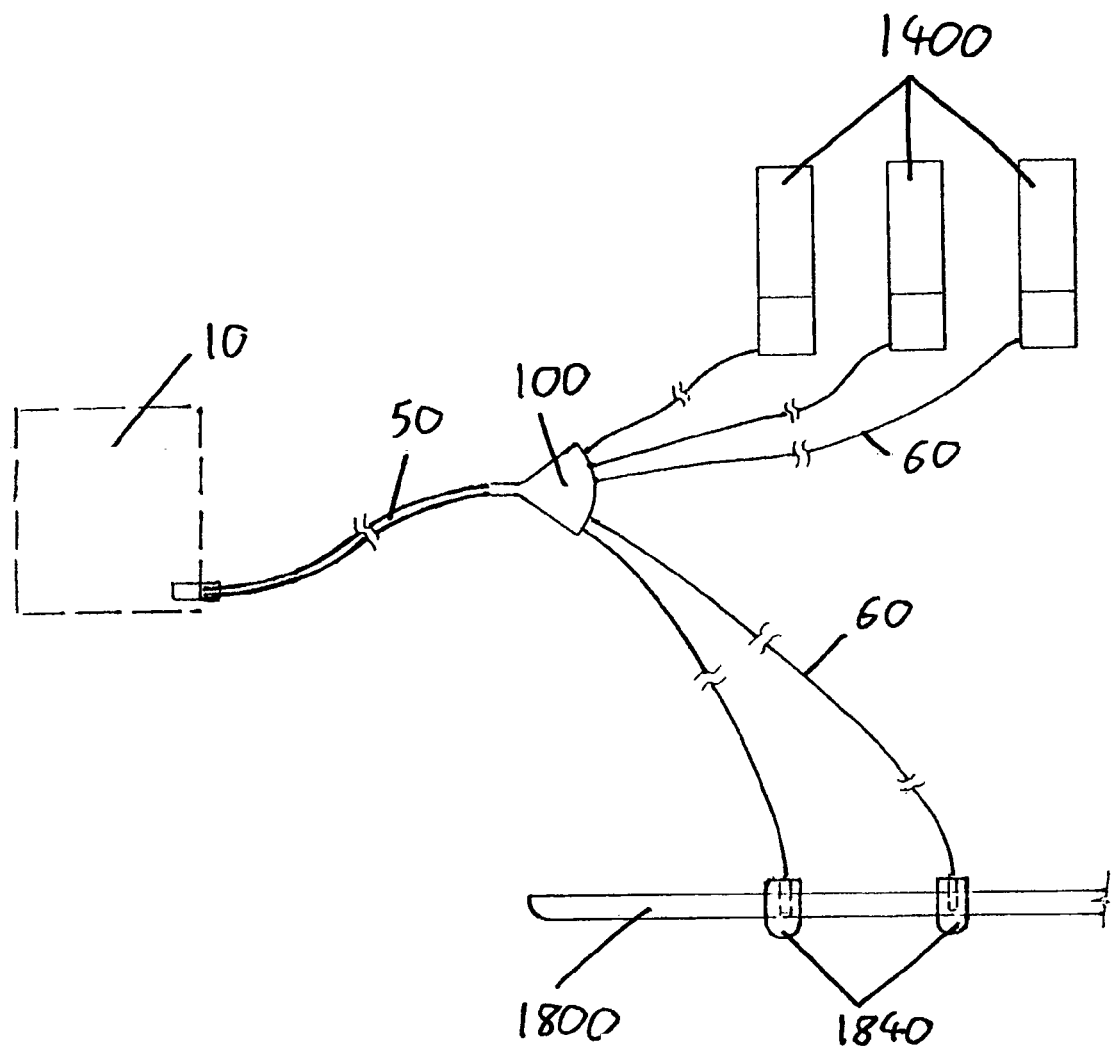
FIG. 16 is a block diagram of an arrangement for distributing light beams by using the splitter of FIGS. 1–3.

In an alternative embodiment of the invention, illustrated in FIG. 16, a central light source 10, which may be a halogen lamp or any other suitable light source, is used to illuminate a first end of a bundle of optical fibers 50. The fibers are then separated in a splitter 100, and strands of optical fibers 60 are fed to light boxes 1400 or to lighting strip 1800 as appropriate, as will be discussed further.

Figure 1:
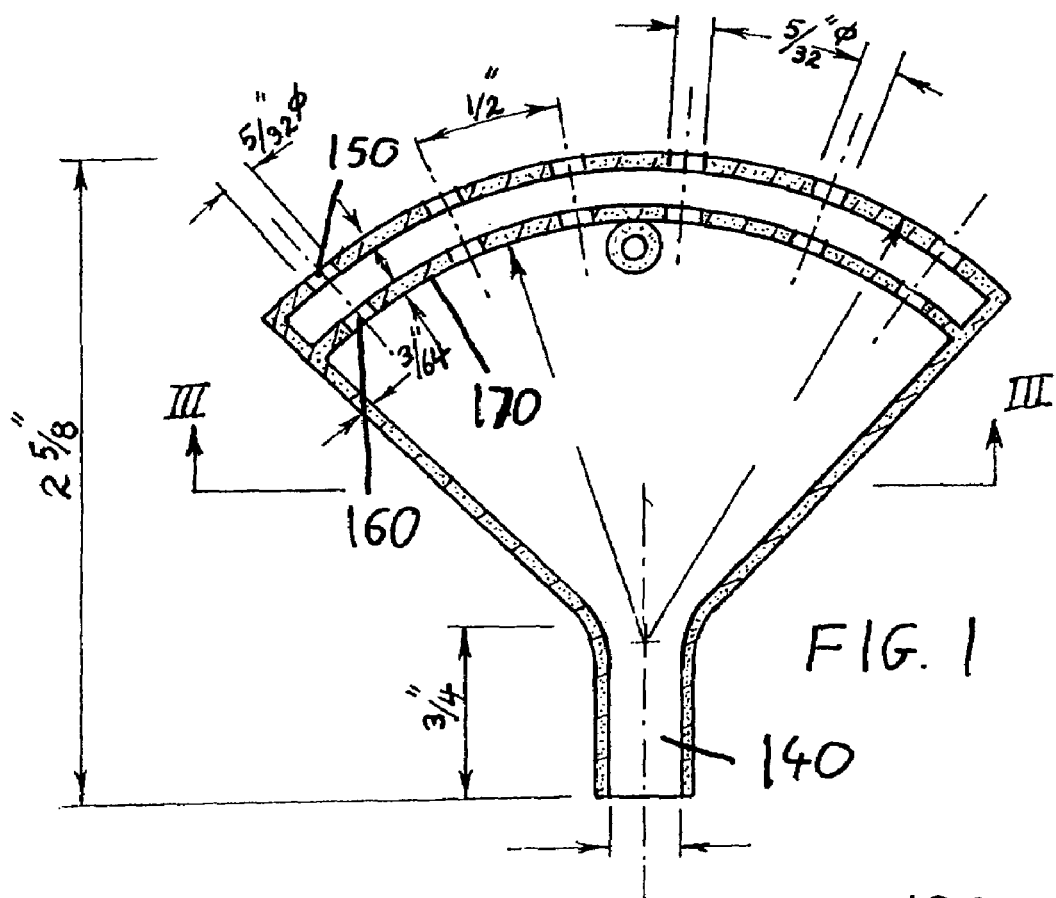
FIG. 1 is a plan view of a fiber optical splitter according to a preferred embodiment of the invention.
Figure 3:
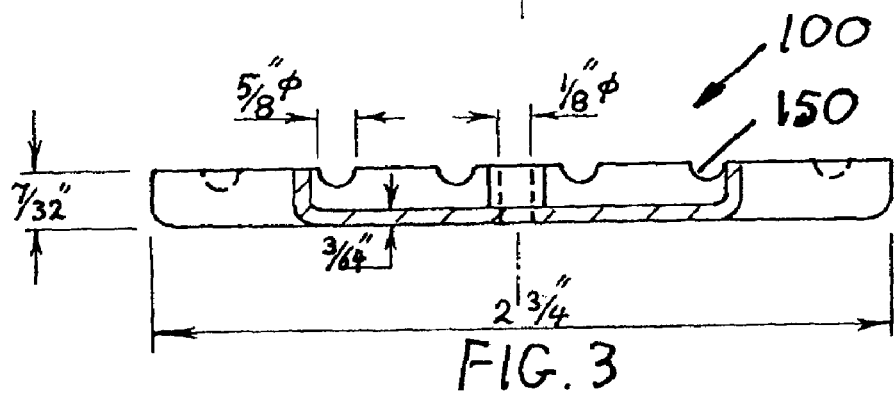
FIG. 3 is an end view of a lower half of a fiber optical splitter according to a preferred embodiment of the invention, when viewed through section III—III.
Figure 2:
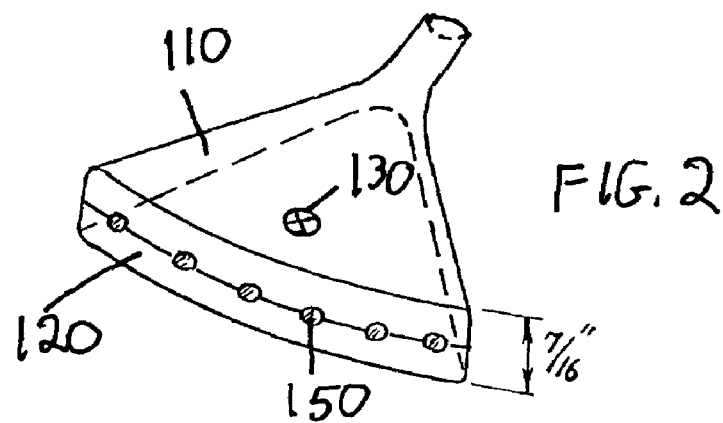
FIG. 2 is a pictorial view of a fiber optical splitter according to a preferred embodiment of the invention.

Splitter 100 is shown in more detail in FIGS. 1, 2 and 3. Splitter 100 may be constructed in upper and lower halves 110, 120, fastened together by screw 130 located in aperture 135, or by any other suitable means. The bundle of fibers 50 from the light source 10 enter the splitter 100 through input aperture 140 and exit through a plurality of output apertures 150, thereby splitting the light from the light source. The optical fibers are additionally aligned by apertures 160 in web 170.

Figure 17:
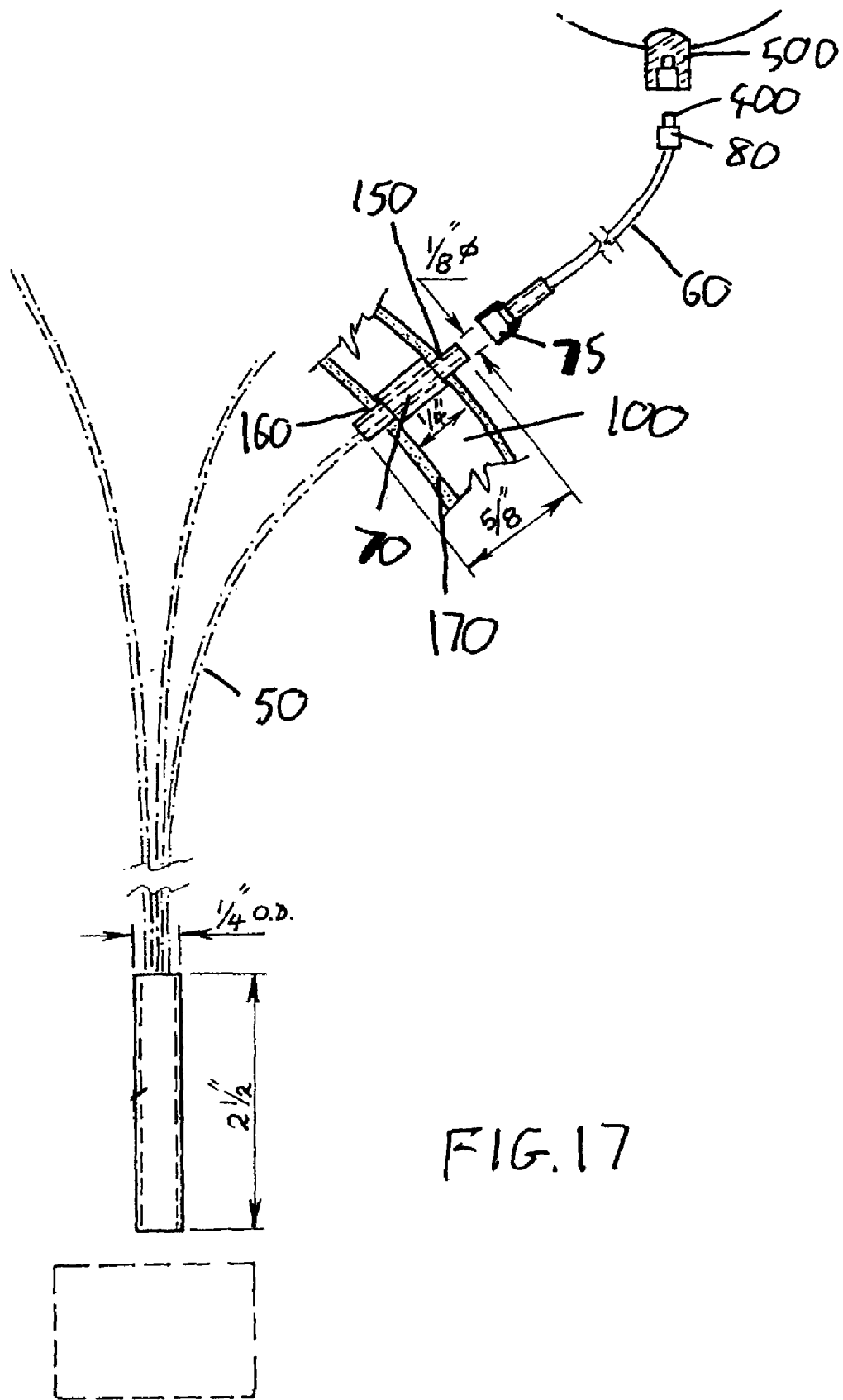
FIG. 17 is a detailed view showing the use of the small lens of FIG. 4 with the splitter.

FIG. 17 shows in more detail how each fiber strand 60 passes first through an aperture 160 in the web 170 in the splitter 100 (only part of which is shown), then through a ferrule 70 which protrudes through a hole 150. Ferrule 70 may be made of brass or any other suitable material, and is retained in place by web 170. Coupler 75 mates with ferrule 70, and is connected through fiber strand 60 to a small lens 400 retained in a lens assembly 80. Small lens 400 may in turn be inserted n large lens 500 as shown.

Small lens 400 is shown in more detail in FIG. 4. The end of the fiber 60 and the rear surface 410 of small lens 400 are each polished before they are coupled together, e.g. with a suitable optical adhesive in lens assembly 80. The front surface 420 of small lens 400 is also highly polished and has a convex curvature the same as that of a standard LED to be used in other embodiments of the invention. The small lens 400 therefore has a center of focus which is not only suitable for use with large lens 500 shown in FIG. 5, but is also suitable for use with a standard reflector (not shown) that is readily available and is designed to have a standard LED placed in the center thereof.

It is often desirable to illuminate an object without illuminating the surroundings. For example, to enable a stair tread to be located without lighting an entire room. FIG. 16 shows a lighting strip 1800 according to another embodiment of the present invention, which can be used for this and other similar purposes. Lighting strip 1800 includes a row of point light sources 1840 that may be either LEDs or small lenses 400. Lighting strip 1800 may be connected to central light source 10 via splitter 100 as also shown in FIG. 16.

It will be appreciated by one skilled in the art that numerous variations and modifications are possible, and that the invention may be practised otherwise than as specifically disclosed herein, without departing from the spirit and scope of the invention.

What is desired to be claimed in Letters Patent is:

1. An electrical connector comprising:
   a first body part;
   a second body part configured to resiliently mate with said first body part;
   said first and second body parts configured to receive insulated conductors therebetween; and
   apertures formed in said first body part in a direction orthogonal to said insulated conductors, said apertures configured to receive contacts;
   said apertures staggered in a longitudinal direction relative to said insulated conductors so as to be separated by a first distance equal to a spacing between leads of a light source, where said spacing is greater than a second distance defined laterally between adjacent said insulated conductors;
   wherein said contacts are configured to penetrate an insulation layer of said insulated conductors when said contacts are inserted into said apertures; and
   wherein said contacts are at least partially hollow, each of said contacts having a central aperture therein configured to receive one of said leads of said light source within said aperture and laterally surrounded by said aperture.

2. The electrical connector according to claim 1, further comprising:
   a first group of channels formed in said first body part and configured to receive said conductors; and
   a second group of channels formed in said second body part and configured to receive said conductors and to oppose said first group of channels.

3. The electrical connector according to claim 2, wherein: said first and second groups of channels each consist of a pair of channels.

4. The electrical connector according to claim 3, wherein: said light source is a light emitting diode.

5. The electrical connector according to claim 1, wherein: said light source is a light emitting diode.

6. An assembly for connecting a plurality of light emitting devices in parallel, said assembly comprising:
   an electrical supply bus, said bus comprising a pair of insulated electrical conductors;
   a plurality of electrical connectors configured to be resiliently attached to said bus;
   said connectors each comprising first and second body parts configured to be resiliently fastened together;
   said first body part provided with apertures in a direction orthogonal to said pair of insulated conductors to receive a pair of contacts;
   said apertures staggered in a longitudinal direction relative to said insulated conductors so as to be separated by a first distance equal to a spacing between leads of said light emitting devices, where said spacing is greater than a second distance defined laterally between said pair of insulated conductors;
   said pair of contacts configured to penetrate an insulation layer of said insulated electrical conductors, said contacts configured to receive leads of said light emitting devices;
   wherein said contacts are at least partially hollow, each of said contacts having a central aperture therein configured to receive one of said leads of said light source within said aperture and laterally surrounded by said aperture.

7. The assembly according to claim 6, wherein: said light emitting devices are light emitting diodes.

8. The assembly according to claim 6, wherein: said pair of insulated conductors are conjoined mechanically along at least part of a length of said conductors.

9. A method of connecting a plurality of light emitting devices in parallel, said method comprising the steps of:
   providing an electrical supply bus, said bus comprising a pair of insulated electrical conductors;
   attaching a plurality of electrical connectors to said bus;
   providing first and second parts of said connectors;
   resiliently fastening together said first and said second body parts of said connectors,
   providing in each said first body part an aperture in a direction orthogonal to each of said pair of insulated conductors to receive an electrical contact;
   said apertures staggered in a longitudinal direction relative to said insulated conductors so as to be separated by a first distance equal to a spacing between leads of said light emitting devices, where said spacing is greater than a second distance defined laterally between said pair of insulated conductors;
   penetrating an insulation layer of each said insulated electrical conductor with said electrical contact, and
   connecting leads of said light emitting devices to each said contact;
   said step of connecting said leads further comprising inserting each said lead into a central aperture within each said contact, such that each said lead is laterally surrounded by each said central aperture.

10. The method according to claim 9, wherein: said light emitting devices are light emitting diodes.

11. The method according to claim 9, wherein: said pair of insulated conductors are conjoined mechanically along at least part of a length of said conductors.

* * * * *